(12) United States Patent
Stamps et al.

(10) Patent No.: US 9,365,288 B2
(45) Date of Patent: Jun. 14, 2016

(54) BLADE-PITCH CONTROL SYSTEM WITH INDEXING SWASHPLATE

(71) Applicant: BELL HELICOPTER TEXTRON INC., Fort Worth, TX (US)

(72) Inventors: Frank B. Stamps, Colleyville, TX (US); Richard E. Rauber, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 850 days.

(21) Appl. No.: 13/678,272

(22) Filed: Nov. 15, 2012

(65) Prior Publication Data

US 2014/0133980 A1 May 15, 2014

(51) Int. Cl.
*B64C 27/78* (2006.01)
*B64C 27/605* (2006.01)

(52) U.S. Cl.
CPC ................... *B64C 27/605* (2013.01)

(58) Field of Classification Search
CPC .................................................. B64C 27/605
USPC .......................... 416/114, 115, 141, 147, 148
See application file for complete search history.

(56) References Cited

U.S. PATENT DOCUMENTS

| | | | |
|---|---|---|---|
| 2,980,187 A | 4/1961 | Smyth-Davila | |
| 3,139,937 A | 7/1964 | Derschmidt | |
| 3,246,862 A * | 4/1966 | Culver | B64C 27/54 244/7 R |
| 4,630,998 A | 12/1986 | Leman et al. | |
| 4,930,988 A | 6/1990 | Griffith | |
| 5,511,947 A | 4/1996 | Schmuck | |
| 5,599,167 A | 2/1997 | Daldosso | |
| 6,074,168 A | 6/2000 | Rampal | |
| 6,616,095 B2 | 9/2003 | Stamps et al. | |
| 7,021,897 B2 * | 4/2006 | Scala | B64C 27/605 416/114 |
| 7,037,072 B2 | 5/2006 | Carson | |
| 8,287,237 B2 | 10/2012 | Stamps | |
| 2003/0183722 A1 | 10/2003 | Zoppitelli et al. | |

(Continued)

FOREIGN PATENT DOCUMENTS

| | | |
|---|---|---|
| CA | 2665676 A1 | 6/2008 |
| DE | 10022728 A1 | 11/2001 |

(Continued)

OTHER PUBLICATIONS

Extended European Search Report issued by the European Patent Office in corresponding application 13187803.5-1754 dated Dec. 4, 2013, 3 pages.

(Continued)

*Primary Examiner* — Nathaniel Wiehe
*Assistant Examiner* — Woody A Lee, Jr.
(74) *Attorney, Agent, or Firm* — James E. Walton

(57) ABSTRACT

The present application includes a blade-pitch control system with an indexing swashplate. A swashplate assembly has a non-rotating portion and a rotating portion and an indexing portion of the mast. The swashplate assembly is translatably affixed to the indexing portion. A pitch link connects the rotating portion of the swashplate assembly to each blade. Translation of the swashplate assembly along the indexing portion causes a change in pitch of the blades and a corresponding indexing of the rotating portion of the swashplate assembly relative to the mast, the indexing causing a change in an angular orientation of each pitch link, thus providing for selected pitch-flap coupling between flapping motion of the yoke and pitch motion of the blades.

16 Claims, 7 Drawing Sheets

(56) References Cited

U.S. PATENT DOCUMENTS

2006/0237581 A1   10/2006   Gerbino
2010/0021301 A1   1/2010    Stamps et al.
2011/0280727 A1*  11/2011   Stamps ................ B64C 27/605
                                                         416/159

FOREIGN PATENT DOCUMENTS

DE    102008028866 A1     12/2009
WO    WO 2010082937 A1 *   7/2010   .............. B64C 27/32

OTHER PUBLICATIONS

Office Action dated Feb. 16, 2015 from counterpart CA App. No. 2,830,374.
International Search Report and Written Opinion in Parent Application PCT/US06/46099, dated Jun. 18, 2008, 7 pages.
International Preliminary Report on Patentability in Parent Application PCT/US06/46099, dated Jun. 10, 2009, 5 pages.
Canadian Search Report in related Canadian Patent Application 2,665,676 by the Canadian Intellectual Property Office, dated Feb. 25, 2011, 2 pages.
Canadian Notice of Allowance in related Canadian Patent Application 2,665,676 by the Canadian Intellectual Property Office, dated Oct. 17, 2011, 1 page.
A First Office Action in related Chinese Application No. 200680056178.1 from the State Intellectual Property Office of the People's Republic of China, dated Apr. 15, 2011, 4 pages.
Second Office Action in corresponding Chinese Patent Application 200680056178.1 from the State Intellectual Property Office of the People's Republic of China, dated Dec. 7, 2011, received by Applicant on Dec. 16, 2011.
Extended European Search Report issued by the European Patent Office in corresponding application 09838519.8-2422 dated Aug. 10, 2012, 6 pages.
International Search Report mailed by ISA/USA, U.S. Patent and Trademark Office on Mar. 3, 2009 for International Patent Application No. PCT/US09/31388.
International Preliminary Report on Patentability mailed by IPEA/USA, U.S. Patent and Trademark Office on Mar. 21, 2011 for International Patent Application No. PCT/US09/31388.
Filing Receipt in U.S. Appl. No. 13/144,433 dated Aug. 11, 2011.
Extended European Search Report issued by the European Patent Office in corresponding application 06838841.2-2422 dated Jul. 12, 2012, 6 pages.

* cited by examiner

BLADE-PITCH CONTROL SYSTEM WITH INDEXING SWASHPLATE

BACKGROUND

1. Field of the Invention

The present application generally relates to blade-control systems for aircraft rotors and specifically relates to a blade-pitch control system having an indexing swashplate.

2. Description of Related Art

Demand is increasing for rotary-wing aircraft, such as helicopters and tiltrotors, to provide more thrust, higher speeds, and carry heavier loads and/or heavier fuselages. Where performance criteria such as these are to be increased, the functional systems of the rotary-wing aircraft must be improved to provide the desired resultant performance enhancements. The rotor system is one of the many functional systems which require improvement in order to meet the demand for improved rotary-wing aircraft performance.

Rotary-wing aircraft have at least one rotor for providing lift and propulsion forces. These rotors have at least two airfoil blades connected to a central hub, and the hub is connected to a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control and which tilts about axes perpendicular to the mast axis for cyclic control. When the swashplate moves toward or away from the rotor, the pitch angle of each blade changes by the same amount, and in the same direction as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

Although great strides have been made in the art of blade-pitch control systems, significant shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
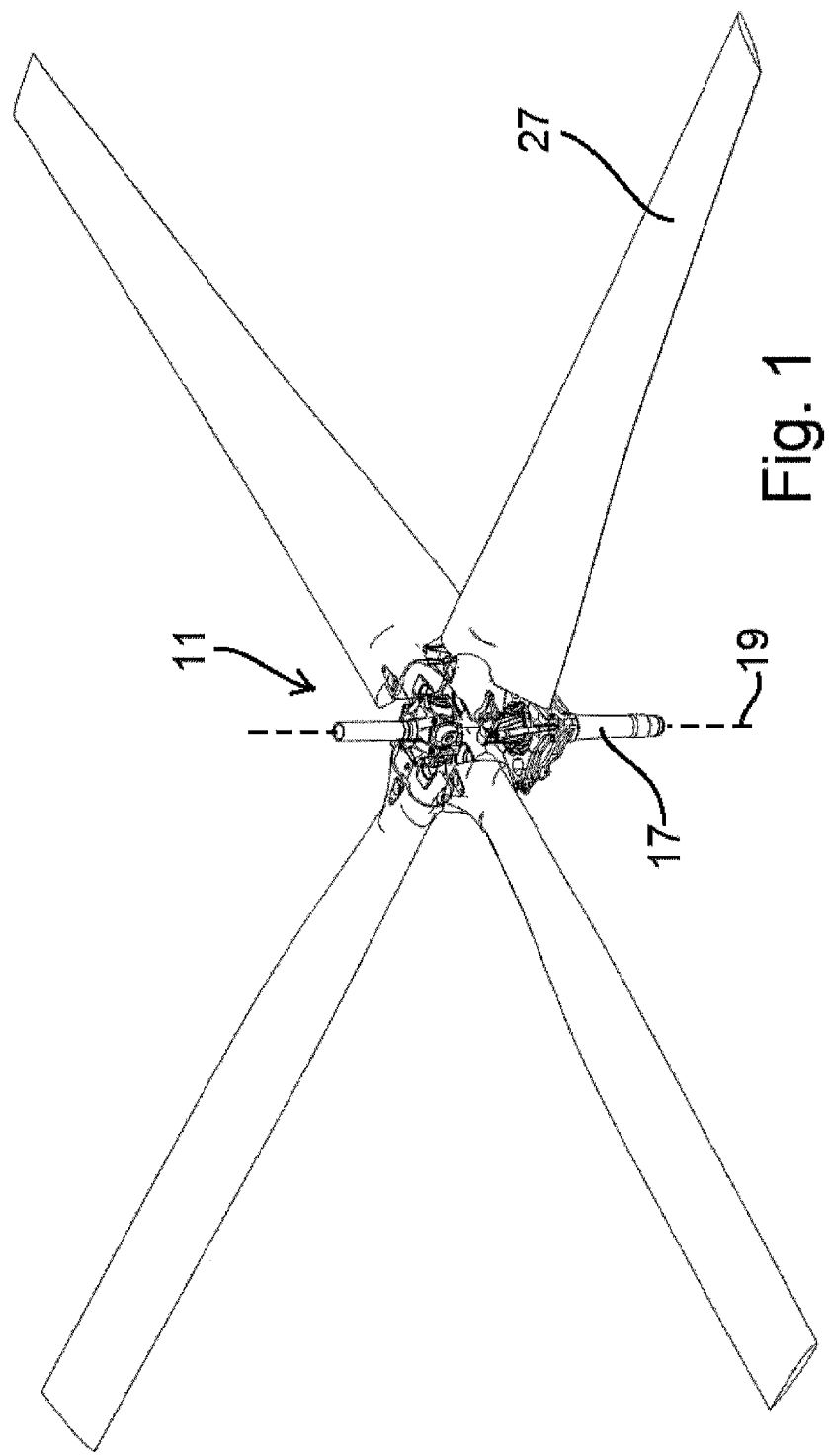
FIG. 1 is an oblique view of a rotor assembly comprising an embodiment of a blade-pitch control system with an indexing swashplate.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "inboard," "outboard," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For example, the rotor assemblies are shown in the drawings in a generally vertical orientation, which is the orientation of the rotor assembly for a helicopter or for a tiltrotor aircraft configured for rotor-borne flight in helicopter mode. In the following description, components of the assembly may be described in relation to this orientation in the drawings, though it should be understood that this is for descriptive purposes only, as the orientation of the assembly will change during use.

The system and method of the present application includes a blade-pitch control system for aircraft rotors, as described herein, which provides for control of the pitch angle of blades attached to the rotor and provides for indexing of the rotating portion of the swashplate assembly relative to the rotor mast. The indexing of the swashplate assembly allows for changing the rotational orientation of the pitch links to 1) provide for reduced delta-3 (pitch-flap coupling) when the swashplate assembly is moved to an inboard position during wing-borne flight ("airplane mode") and 2) provide for increased delta-3 and prevent contact of the pitch links with the yoke when the swashplate assembly is moved to an outboard position during rotor-borne flight ("helicopter mode"). Another advantage of the rotor assembly is that changing the angular orientation of the pitch links to prevent contact with the yoke allows for additional collective control during helicopter mode flight.

Figure 2:
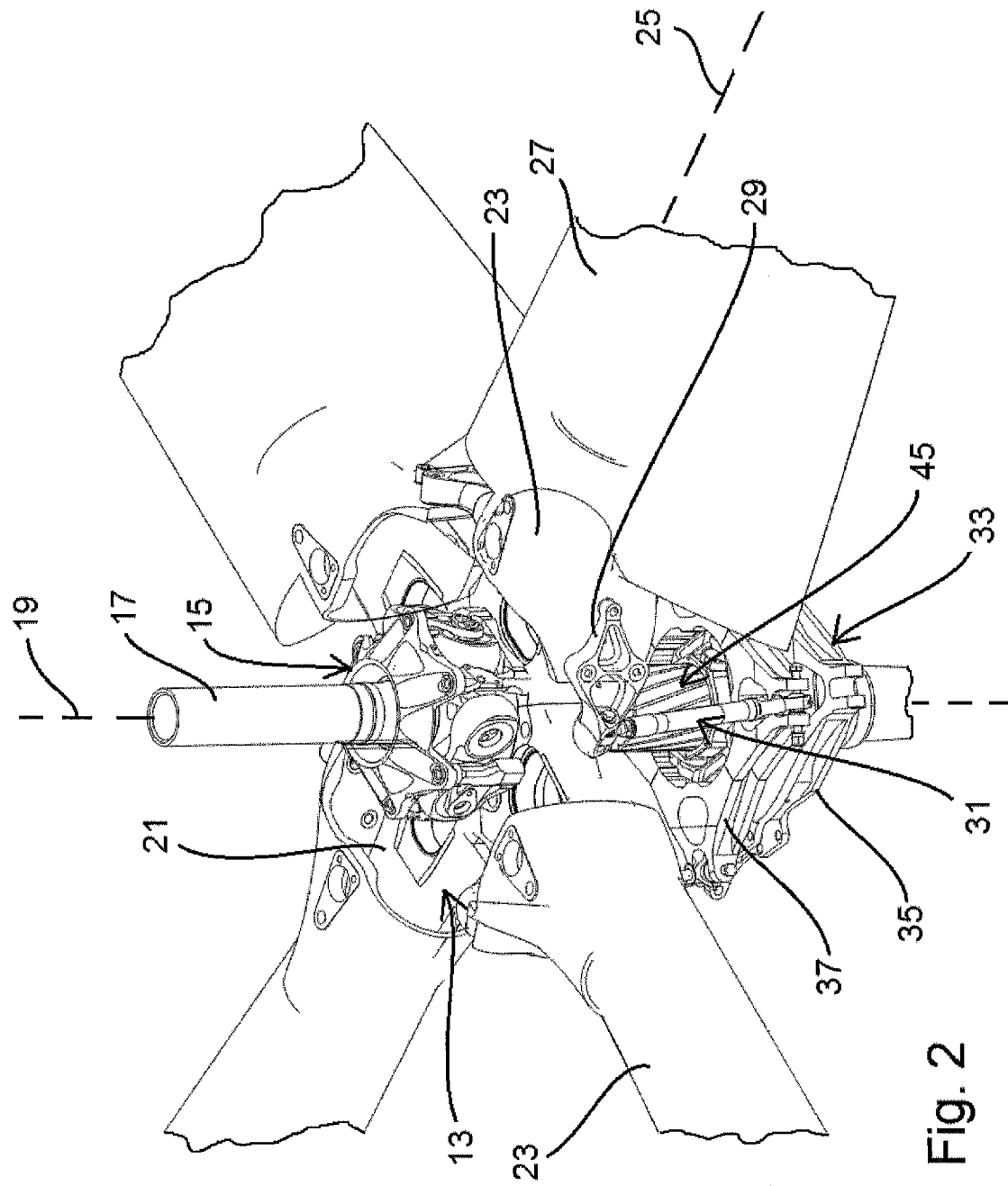
FIG. 2 is an enlarged oblique view of a portion of the rotor assembly of FIG. 1.
Figure 3:
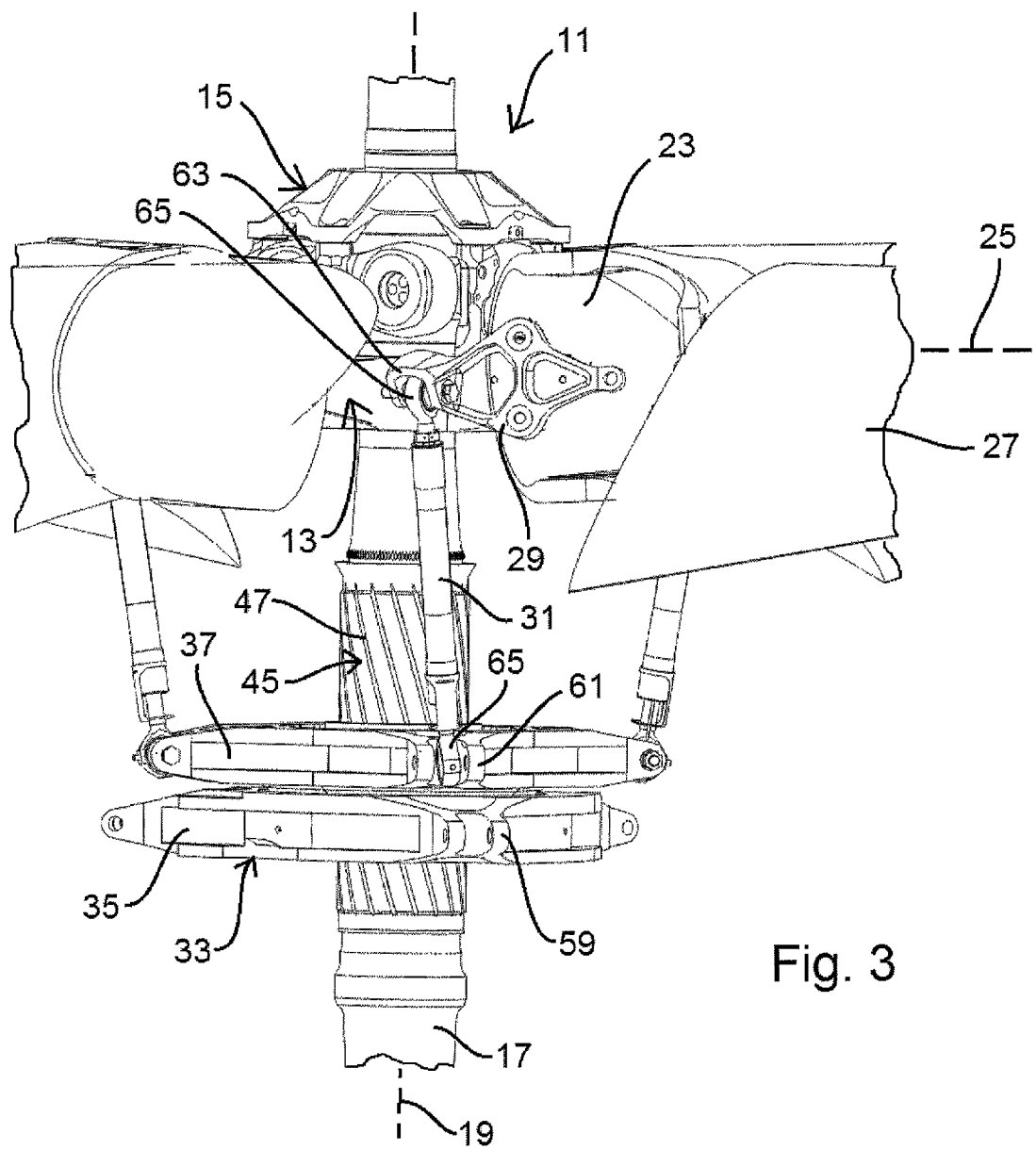
FIG. 3 is a side view of the rotor assembly of FIG. 1.
Figure 4:
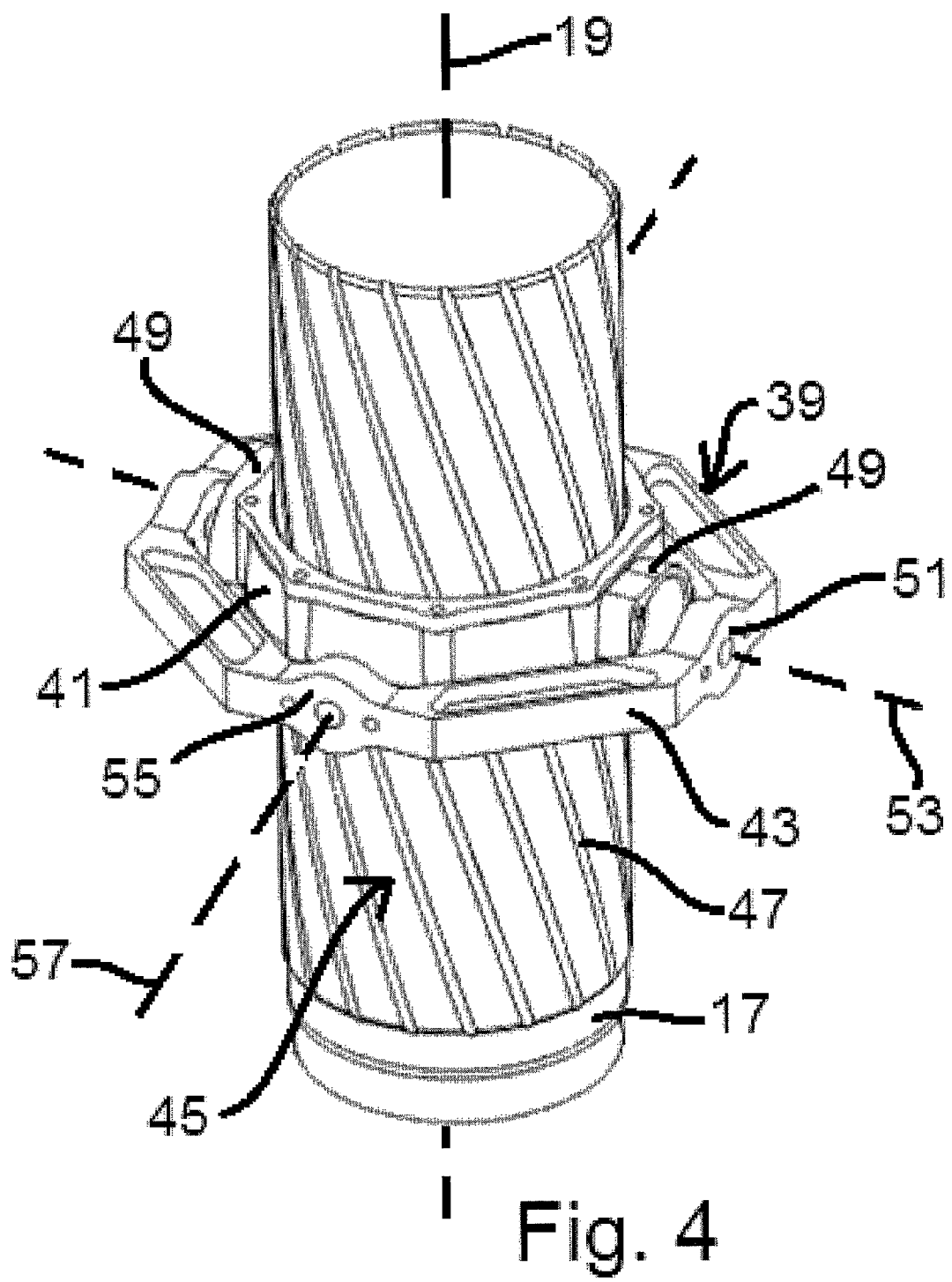
FIG. 4 is an oblique view of an indexing portion of the rotor assembly of FIG. 1.
Figure 5:
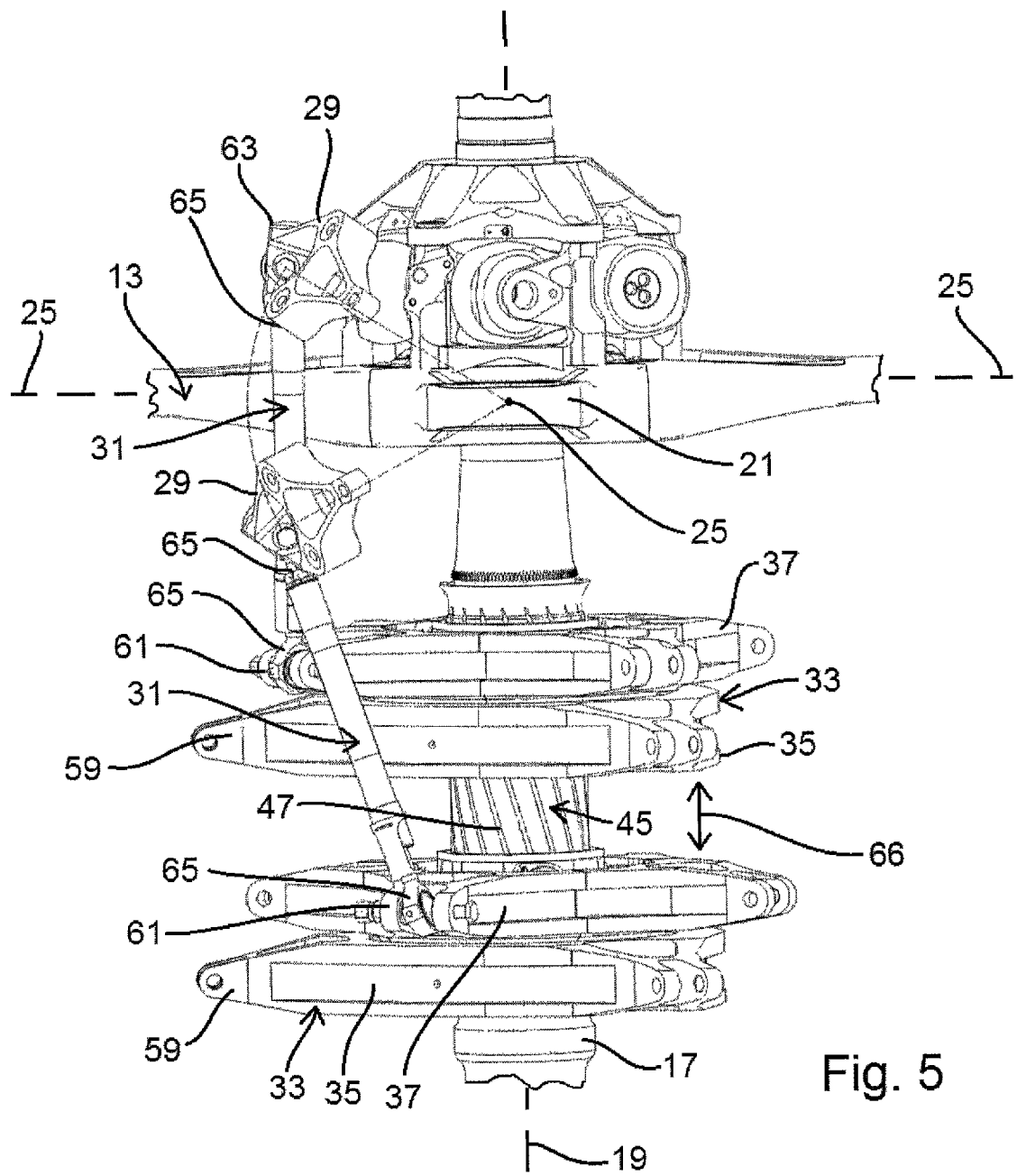
FIG. 5 is a side view of a portion of the rotor assembly of FIG. 1 with some of the components being removed for ease of viewing, the swashplate assembly being shown in inboard and outboard positions at the extents of swashplate travel.
Figure 6:
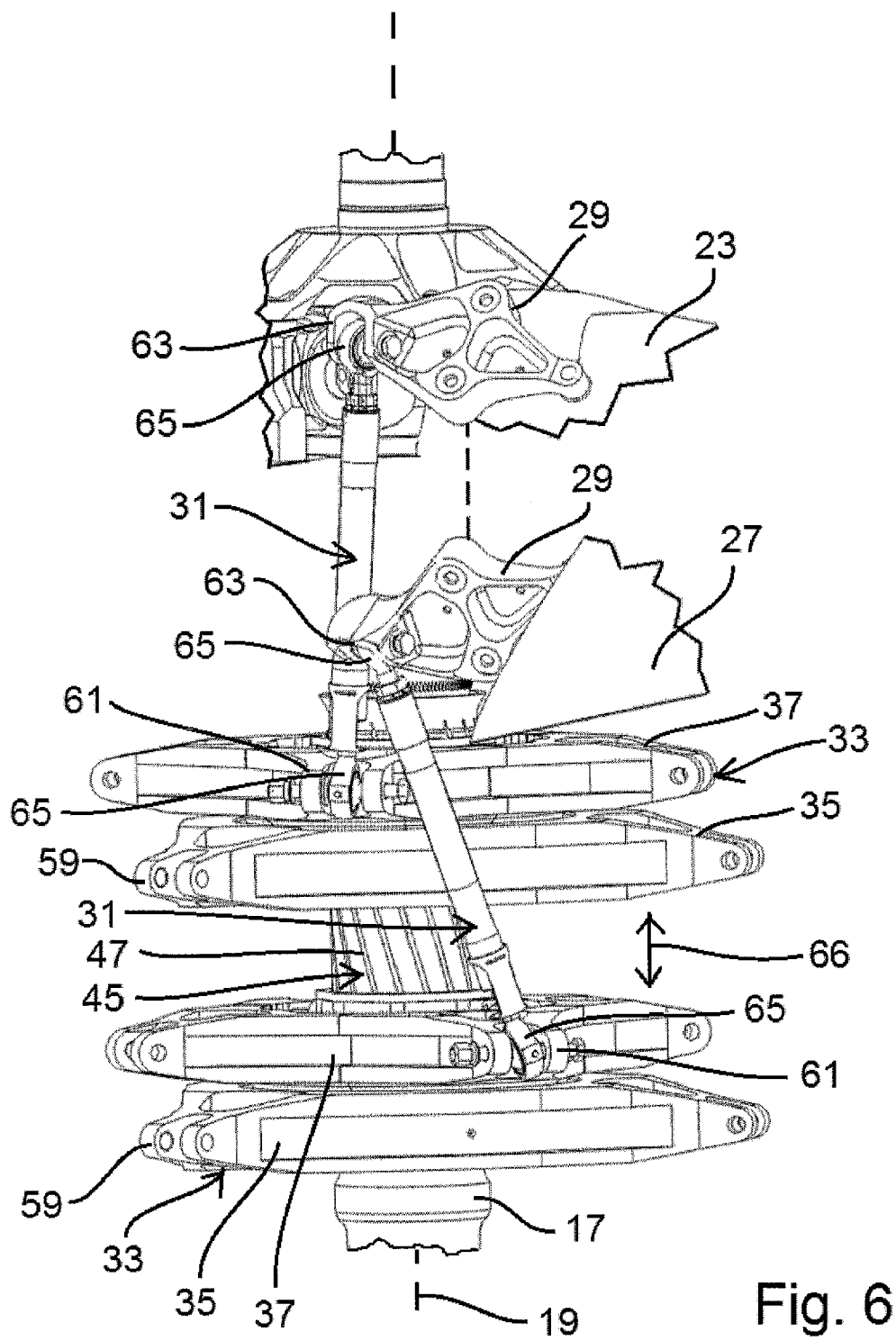
FIG. 6 is another side view of a portion of the rotor assembly of FIG. 1 with some of the components being removed for ease of viewing, the swashplate assembly being shown in inboard and outboard positions at the extents of swashplate travel.

FIGS. 1 through 6 illustrate an embodiment of a blade-pitch control system having an indexing swashplate assembly. In FIGS. 4 through 6, portions of the system are removed for ease of viewing.

Referring to FIGS. 1 through 3, a tiltrotor rotor assembly 11 comprises a central yoke 13 rotatably mounted with a constant-velocity (CV) joint 15 to rotor mast 17. This allows yoke 13 to pivot about flap axes perpendicular to axis 19 of mast 17 while mast 17 drives yoke 13 in rotation with mast 17 about mast axis 19.

During operation, the blades of a rotor system may move in a flapping motion, in which the blades move in out-of plane directions due to aerodynamic forces on the blades. For example, during forward movement in rotor-borne flight, an advancing blade is subjected to a given speed of air across the blade, which produces lift on that blade and causes it to rise in an out-of-plane direction. A corresponding effect is seen with a blade on the opposite side of the rotor mast, as it will be retreating and be subjected to a lower speed of air across the blade, resulting in the blade producing a smaller amount of lift. In a rotor having a yoke connected to the mast with a gimbal, such as CV joint 15, the result of these two forces are that the yoke rotates about the flapping axes of the gimbal.

Yoke 13 comprises multiple arms 21 extending generally radially from the central region of yoke 13. A blade grip 23 is rotatably mounted to each arm 21, such that each grip 23 is rotatable relative to the associated arm 21 about a corresponding pitch axis 25. Grip 23 may be an integral, inboard portion of a rotor blade 27 or may be configured for attachment of a separate rotor blade 27. A fixed pitch horn 29 extends from an inner portion of each grip 23, and a rigid pitch link 31 is rotatably connected to each pitch horn 29. This configuration allows for movement of each pitch link 31 in directions generally parallel to mast axis 19 to cause rotation of the associated grip 23 and associated blade 27 about the corresponding pitch axis 25.

A swashplate assembly 33 comprises an inboard non-rotating swashplate 35 and an adjacent, coaxial, and outboard rotating swashplate 37, which is rotatably attached to swashplate 35 with bearings in a manner that allows swashplate 37 to freely rotate relative to swashplate 35 about their shared axis while providing for transfer of mechanical forces (other than torsional forces about their shared axis) between swashplates 35 and 37. During operation, rotating swashplate 37 rotates along with mast 17 and yoke 13 about mast axis 19, whereas non-rotating swashplate 35 does not rotate with mast 17 about axis 19.

Rotating swashplate 37 is coupled to mast 17 in a manner that allows swashplate assembly 33 to translate a limited amount along the length of mast 17 and to tilt about axes perpendicular to mast 17. Referring to FIG. 4, a CV joint 39 comprises an inner ring 41 and an outer ring 43. Inner ring 41 is slidably affixed to mast 17, allowing for translation of ring 41 to any position between inboard and outboard extents along a limited portion of mast 17. In the embodiment shown in FIGS. 1 through 6, inner ring 41 slides along indexing portion 45, which comprises helical splines 47. Features (not shown) on an inner surface of inner ring 41 engage splines 47 to cause a limited amount of indexing rotation of inner ring 41 relative to mast 17 as ring 41 translates relative to mast 17. Outer ring 43 is rotatably connected to opposing pivot mounts 49 of inner ring at pivot mounts 51, allowing rotation of outer ring 43 relative to inner ring 41 and mast 17 about axis 53. Rotating swashplate 37 is rotatably attached to outer ring 43 at opposing pivot mounts 55, allowing rotation of rotating swashplate 37 relative to outer ring 43 and mast 17 about axis 57, which is perpendicular to axis 53.

Referring again to FIGS. 3, 5 and 6, to control the motions of swashplate assembly 33 relative to mast 17, non-rotating swashplate 35 is connected to a swashplate actuation system (not shown) at three input clevises 59, which are equally spaced about non-rotating swashplate 35 every 120 degrees. Actuators (not shown) are connected to input clevises 59 for causing translation along mast 17 of swashplate assembly 33 for collective blade-pitch control and/or tilting of swashplate assembly 33 for cyclic blade-pitch control. The operation of the actuation system is in response to inputs from a pilot and/or a flight control system.

To connect rotating swashplate 37 to pitch horns 29, four output clevises 61 are equally spaced about rotating swashplate 37 every 90 degrees, and each pitch horn 29 has a clevis 63. Pitch links 31 comprise opposing spherical rod ends 65 or similar connectors for allowing pitch links 31 to rotate be connected to devises 61, 63 while allowing for rotation of pitch links 31 relative to clevises 61, 63, as occurs during translation and/or tilting of swashplate assembly 33 and during flapping of yoke 13.

During operation of rotor assembly 11, torque is applied to mast 17 and to yoke 13 through CV joint 15. Torque is also transferred from mast 17 to inner ring 41 of CV joint 39 through splines 47 of indexing portion 45, and then to outer ring 43 through pivot mounts 49, 51. Torque is then transferred from outer ring 43 to rotating swashplate 37 through pivot mounts 55, causing non-rotating swashplate to rotate about mast axis together with mast 17 and yoke 13.

A swashplate actuation system causes swashplate assembly 33 to translate along indexing portion 45 and/or tilt relative to mast 17. When swashplate assembly 31 is translated in directions indicated by bi-directional arrow 66, the motion parallel to mast axis 19 of assembly 31 is transferred from non-rotating swashplate 35 to pitch horns 29 through the mechanical connections of non-rotating swashplate 35 to rotating swashplate 37. This motion is then transferred through pitch links 31 to each pitch horn 29, resulting in collective control of the pitch of all grips 23 and associated blades 27. Likewise, when swashplate assembly 31 is tilted, the tilting motion relative to mast axis 19 of assembly 31 is transferred from non-rotating swashplate 37 to pitch horns 29 through pitch links 31, resulting in differential, cyclic control of the pitch of all grips 23 and associated blades 27.

Referring specifically to FIGS. 5 and 6, swashplate assembly 33 is shown in the inboard and outboard extents of travel along indexing portion 45. The inboard extent is farther from yoke 13, and the outboard extent is closer to yoke 13. In addition, a pitch link 31 and associated pitch horn 29 are shown in the positions corresponding to the inboard and outboard positions of swashplate assembly 33 (with yoke in an unflapped orientation).

In operation during flight in helicopter mode, swashplate assembly 33 is generally located in the outboard ⅔ of indexing portion 45, whereas during flight in airplane mode, swashplate assembly 33 is generally located in the inboard ⅓ of indexing portion 45. During airplane mode flight, optimal delta-3 is achieved by a significant angle difference between pitch links 31 and mast 17, which reduces pitch change amount per amount of flapping. Though this incline of pitch link 31 is desirable, if pitch links 31 were maintained at this angle as swashplate assembly 33 is moved to the outboard extent of travel, pitch links 31 would contact a portion of yoke 13. This could be prevented by reducing the extent of travel of swashplate assembly 33, but this would also reduce the amount of collective control for blades 27.

A significant advantage to use of indexing rotating swashplate 37 is the ability to prevent pitch links 31 from contacting yoke 13 by changing the angular orientation of pitch links 31 as swashplate assembly 33 is moved between inboard and outboard positions. As swashplate assembly 33 moves along indexing portion 45, splines 47 cause CV joint 39 and rotating swashplate 37 to index about mast 17 relative to yoke 13, changing the angle of pitch links 31 relative to the system. As shown in the figures, pitch link 31 is approximately parallel to mast when swashplate assembly 33 is at the outboard extent, whereas pitch link 31 is inclined when swashplate assembly 33 is at the inboard extent. In certain applications, this inclination of link 31 may be as much or more than 60 degrees relative to the mast axis to provide for the desired reduction in delta-3 at the inboard position. By indexing swashplate 37, thereby changing the orientation of pitch link 31 to be more parallel to mast 17, pitch link will no longer contact yoke 13 when swashplate assembly 33 is moved to the outboard extent. This prevents an undesirable effect while still providing for the full amount of collective control.

The amount of indexing may be selected to optimize the particular application, but there exists a total maximum indexing angle available due to packaging and interference constraints. For example, the system shown on assembly 11 may be constrained to approximately 60 degrees of indexing before pitch links 31 contact mast 17 due to the rotation of swashplate 37 relative to yoke 13. While the available indexing amount will be different for particular applications, there will be a limit based, in part, on the length of the pitch link, distance from the mast, etc.

The system of 11 is shown with pitch links 31 varying in orientation between the upright outboard position, in which link 31 is substantially parallel to mast axis 19, and the inclined inboard position, in which link 31 is significantly inclined relative to mast axis 19. In the outboard position, the lower end of link 31 and clevis 61 are close to being in line with the upper end of link 31 and clevis 63 on pitch horn 29. As can be seen in FIG. 6, clevis 61 slightly trails clevis 63 in the direction of rotation of assembly 11, though clevis 61 may lead clevis 63 at the outboard position in other applications. In some applications, clevis 61 may trail clevis 63 by 15 degrees in the outboard position and then lead clevis 63 by 45 degrees in the inboard position. Also, it may be preferable to have a non-linear indexing, such that clevis 61 trails, then leads, and then trails again clevis 63 as swashplate assembly 33 is translated between the inboard and outboard positions.

Another advantage of this blade-pitch control system is that the amount of pitch-flap coupling is adjustable through selection of characteristics of the assembly. For example, the choice of relative lengths or locations of, for example, clevises 61, 63, pitch links 31, and grips 31 will determine the angle change of pitch link 31 as swashplate assembly 33 translates. Also, whereas splines 47 are described as being helical, it may be desirable to use splines having non-constant curvature that cause rotating swashplate 37 to index at varied rotational speeds for a given amount of translation. Additional modifications may be necessary to achieve the desired results, as the amount of desired pitch-flap coupling will vary based on the specific application. The described system is especially useful for a tiltrotor aircraft, as the system provides the required delta-3 control input for stability during forward, wing-borne flight of the tiltrotor when configured in airplane mode. It should also be noted that although the system is shown in conjunction with a gimbaled rotor, the system may also be used with articulated or soft-in-plane rotors.

Figure 7:
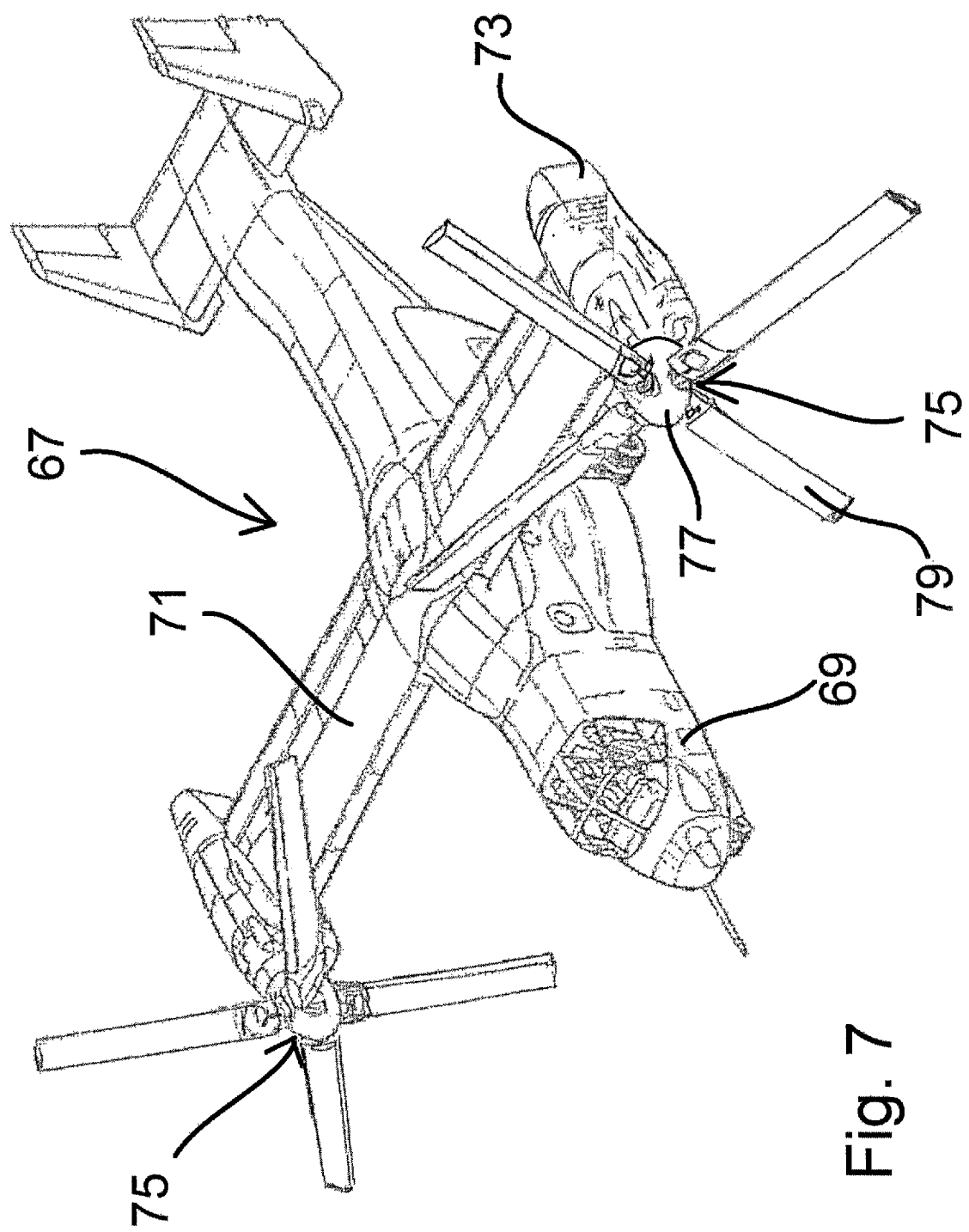
FIG. 7 is an oblique view of an aircraft with an embodiment of the rotor assembly of FIG. 1 installed thereon.

Referring to FIG. 7, tiltrotor aircraft 67 includes a fuselage 69 and wing 71 attached to fuselage 69. Rotating engine nacelles 73 are pivotally mounted to opposing ends of wing 71 and house engines (not shown) for supplying torque to turn a rotor mast housed in each nacelle 73. Two rotors 75 each comprise a central rotor assembly housed under an aerodynamic cover 77, and each rotor 75 has a blade-pitch control system an indexing swashplate, such as assembly 11, which is shown and described above. The rotor assembly of each rotor 75 connects blades 79 to the associated rotor mast, the masts being driven in rotation by the torque from the engines for rotating rotors 75. Tiltrotor 67 is capable of flying in a helicopter mode, in which each nacelle 73 is positioned approximately vertical, and flying in an airplane mode, in which each nacelle 73 is positioned approximately horizontal (as shown).

Tiltrotor 67 Is illustrated as an exemplary aircraft that may employ the system of the present application. It should be appreciated any variety of aircraft types may use the system of the present application for main rotor blades, tail rotor blades, or propellers. A non-exhaustive list of exemplary aircraft types may include airplanes, gyrocopters, and unmanned aircraft.

The system of the present application provides significant advantages, including providing for indexing of a non-rotating swashplate to change the angular orientation of pitch links.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. A blade-pitch control system for controlling a pitch angle of each of a plurality of blades on an aircraft rotor, the blades being rotatably connected to a yoke for rotation with a rotor mast, the control system comprising:
   a swashplate assembly having a non-rotating portion and a rotating portion;
   an indexing portion of the mast, the swashplate assembly being translatably affixed to the indexing portion;
   a pitch link connecting the rotating portion of the swashplate assembly to each blade;
   wherein translation of the swashplate assembly along the indexing portion causes a change in pitch of the blades and a corresponding indexing of the rotating portion of the swashplate assembly relative to the mast, the indexing causing a change in an angular orientation of each pitch link, thus providing for selected pitch-flap coupling between flapping motion of the yoke and pitch motion of the blades; and
   wherein the indexing portion comprises curved splines connected to and causing indexing of the rotating portion of the swashplate.

2. The blade-pitch control system of claim 1, wherein the curved splines are helical in shape.

3. The blade-pitch control system of claim 1, wherein the curved splines have a non-constant curvature.

4. The blade-pitch control system of claim 1, wherein an end of each pitch link connected to the rotating portion of the swashplate assembly trails the opposite end of the pitch link in one indexed position and leads the opposite end in another indexed position.

5. The blade-pitch control system of claim 1, wherein indexing of the rotating portion of the swashplate assembly prevents contact of the pitch link with the yoke during operation.

6. The blade-pitch control system of claim 1, wherein selective indexing of the rotating portion of the swashplate assembly causes rotation of each pitch link between an orientation that is substantially parallel to the mast axis and an orientation inclined relative to the mast axis.

7. A method of controlling a pitch angle of each of a plurality of blades on an aircraft rotor, the blades being rotatably connected to a yoke for rotation with a rotor mast, the method comprising:
  (a) providing a swashplate assembly having a non-rotating portion and a rotating portion;
  (b) connecting the rotating portion to an indexing portion of the mast; and providing curved splines on the indexing portion;
  (c) connecting the rotating portion to the blades with pitch links; and
  (d) translating the swashplate assembly along the indexing portion for causing a change in pitch of the blades and a corresponding indexing of the rotating portion of the swashplate assembly relative to the mast, the indexing causing a change in an angular orientation of each pitch link, thus providing for selected pitch-flap coupling between flapping motion of the yoke and pitch motion of the blades.

8. The method of claim 7, wherein step (d) comprises indexing the rotating portion of the swashplate assembly so that one end of the pitch link trails the opposite end of the pitch link in one indexed position and leads the opposite end in another indexed position.

9. The method of claim 7, wherein step (d) comprises indexing the rotating portion of the swashplate assembly to prevent contact of the pitch link with the yoke during operation.

10. The method of claim 7, wherein step (d) comprises selectively indexing the rotating portion of the swashplate assembly to cause rotation of each pitch link between an orientation that is substantially parallel to the mast axis and an orientation inclined relative to the mast axis.

11. An aircraft having a blade-pitch control system for controlling a pitch angle of each of a plurality of blades on an aircraft rotor, the blades being rotatably connected to a yoke for rotation with a rotor mast, the control system comprising:
  a swashplate assembly having a non-rotating portion and a rotating portion;
  an indexing portion of the mast, the swashplate assembly being translatably affixed to the indexing portion;
  a pitch link connecting the rotating portion of the swashplate assembly to each blade;
  wherein translation of the swashplate assembly along the indexing portion causes a change in pitch of the blades and a corresponding indexing of the rotating portion of the swashplate assembly relative to the mast, the indexing causing a change in an angular orientation of each pitch link, thus providing for selected pitch-flap coupling between flapping motion of the yoke and pitch motion of the blades; and
  wherein the indexing portion comprises curved splines connected to and causing indexing of the rotating portion of the swashplate.

12. The aircraft of claim 11, wherein the curved splines are helical in shape.

13. The aircraft of claim 11, wherein the curved splines have a non-constant curvature.

14. The aircraft of claim 11, wherein an end of each pitch link connected to the rotating portion of the swashplate assembly trails the opposite end of the pitch link in one indexed position and leads the opposite end in another indexed position.

15. The aircraft of claim 11, wherein indexing of the rotating portion of the swashplate assembly prevents contact of the pitch link with the yoke during operation.

16. The aircraft of claim 11, wherein indexing of the rotating portion of the swashplate assembly causes selective rotation of each pitch link between an orientation that is substantially parallel to the mast axis and an orientation inclined relative to the mast axis.

* * * * *